United States Patent Office 3,401,192
Patented Sept. 10, 1968

3,401,192
ESTERS OF 5H-DIBENZO[a,d]CYCLOHEPTENE
Janos Kollonitsch, Westfield, and Roger J. Tull, Metuchen, N.J., assignors to Merck & Co., Inc., Rahway, N.J., a corporation of New Jersey
No Drawing. Continuation-in-part of application Ser. No. 210,589, July 17, 1962. This application July 20, 1964, Ser. No. 383,920
2 Claims. (Cl. 260—471)

This application is a continuation-in-part of application Ser. No. 210,589 filed July 17, 1962.

This invention relates to a method for making derivatives of dibenzocycloheptenes. In particular, the invention is concerned with a method of making 5-(3-methylaminopropyl)-5H-dibenzo[a,d]cycloheptene, 5 - (3-methylaminopropylidene)-5H-dibenzo[a,d]cycloheptene and nuclearly substituted derivatives thereof. This invention also includes the synthesis of intermediates used for obtaining the above compounds.

The process of the invention may be illustrated as follows:

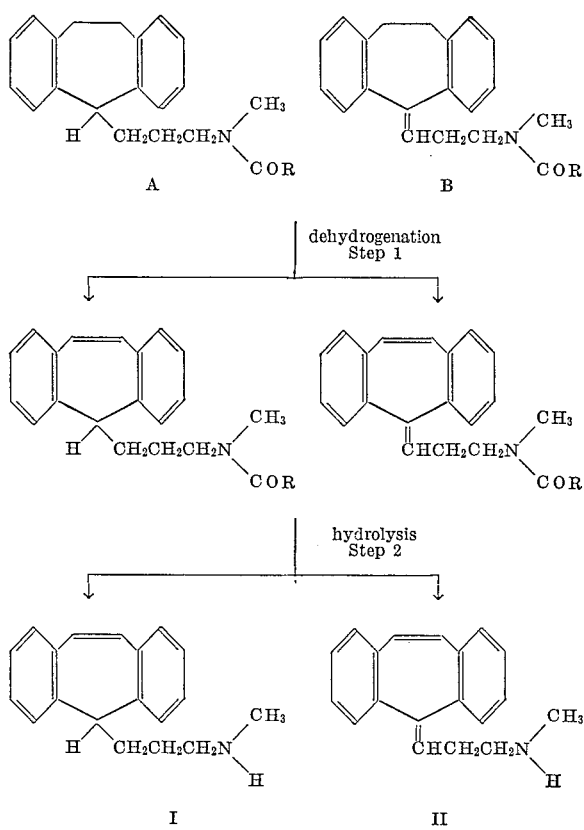

In the above reaction sequence, R may be alkyl, aryl, aralkyl, alkoxy, aryloxy and aralkoxy. It will be readily apparent to those skilled in the art that inasmuch as the R group is removed during the process, it is not critical which particular group is utilized to form the intermediate urethane or N-acyl derivative and the choice thereof is subject only to the sensitivity of the group to dehydrogenation, ease of hydrolysis and other practical and economical considerations. However, the preferred groups are alkoxy and aryloxy.

While the above process is particularly suitable for the preparation of 5-(3-methylaminopropyl) - 5H - dibenzo-[a,d]cycloheptene (Compound I) and 5-(3-methylaminopropylidene) - 5H-dibenzo[a,d]cycloheptene (Compound II), it may be used with equal facility for the preparation of those compounds which may be substituted in either or both of the benzene moieties providing such substituents remain unaffected during the process. Thus, for example, using the appropriately substituted starting material, the above process may be used to prepare 5-(3-methylaminopropyl)-5H-dibenzo[a,d]cycloheptenes and 5-(3-methylaminopropylidene) - 5H - dibenzo[a,d]cycloheptenes which are nuclearly substituted with one or more groups such as lower alkyl, perfluoroloweralkyl, amino, loweralkylamino, diloweralkylamino, loweralkylsulfonylamino, halogen, hydroxy, lower alkoxy, perfluoroloweralkoxy, cyano, carboxy, mercapto, loweralkylmercapto, perfluoroloweralkylmercapto, loweralkylsulfonyl, perfluoroloweralkylsulfonyl, sulfamoyl, loweralkylsulfamoyl and diloweralkylsulfamoyl.

As illustrated by the reaction scheme above, the first step of the process involves the dehydrogenation of the starting urethane (wherein R is alkoxy, aryloxy or aralkoxy) or N-acyl compound (wherein R is alkyl, aryl or aralkyl) to form the corresponding 10,11-unsaturated compound. The dehydrogenation may be accomplished by heating the urethane or N-acyl compound in the presence of a conventional dehydrogenating agent such as palladium on charcoal, platinum oxide or Raney nickel, at customary elevated temperatures such as from about 200 to about 250° C. A solvent may be used if desired. Suitable solvents include tetrahydronaphthalene, dimethyl ether of diethylene glycol. However, it is preferred to carry out the dehydrogenation employing a halogen-containing dehydrogenating agent. Suitable agents of this type include N-bromosuccinimide, N-chlorosuccinimide, bromine, chlorine and sulfuryl chloride. Dehydrogenation in this manner can sometimes be effected without the aid of a solvent, but it is preferred to employ an inert organic solvent such as, for example, carbon tetrachloride, benzene, chloroform and methylene chloride. In addition, the reaction with the halogen-containing dehydrogenating agent is preferably carried out in the presence of a small amount of a free radical generator such as azo-bis-butyronitrile, and a hydrogen halide acceptor such as pyridine, collidine, allyl chloride or an epoxide. When a halogen-containing dehydrogenating agent is employed, it is possible that some 10 or 11-halo compound will be formed along with the desired 10,11-unsaturated compound. Accordingly, to insure maximum yield of the desired 10,11-unsaturated product, it is preferred to treat the reaction mixture obtained with a conventional dehydrohalogenating agent. Preferably, the dehydrohalogenation is effected by the removal of hydrogen halide using a tertiary amine such as triethylamine. The dehydrogenated product obtained from either of the above procedures can be readily recovered using conventional techniques.

In the second step of the process, the intermediate 10,11-unsaturated compound resulting from Step 1 is hydrolyzed to form the desired monomethylaminopropyl or monomethylaminopropylidene derivative. The hydrolysis may be accomplished in conventional manner under either acidic or basic conditions employing aqueous or alcoholic solutions of potassium hydroxide, sodium hydroxide, hydrochloric acid, acetic acid and the like as the hydrolyzing medium. Preferably, however, the hydrolysis is effected under basic conditions. After completion of the hydrolysis, the desired product is recovered in conventional manner.

The preparation of those starting compounds utilized in Step 1 of the process, wherein R is alkyl, aryl or aralkyl, is accomplished by hydrolyzing the appropriate 10,11-dihydro urethane to the corresponding monomethyl derivative following the procedure of Step 2 hereinabove and then acylating the latter. This may be illustrated as follows:

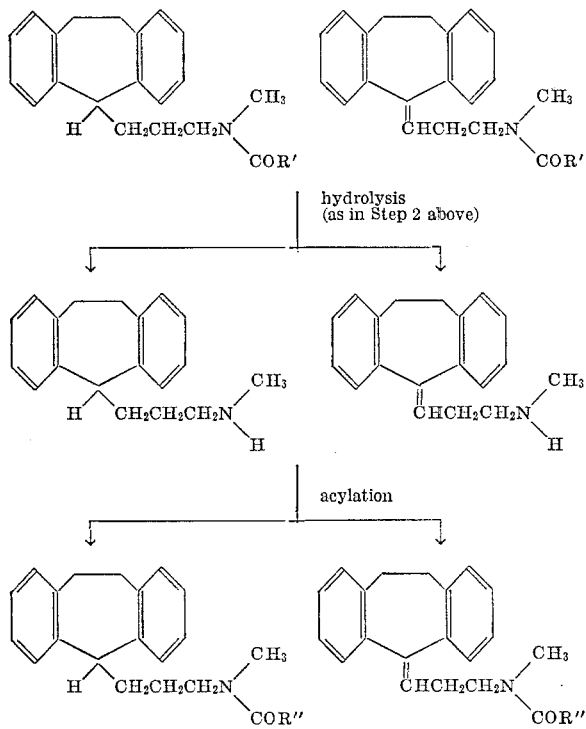

In the above process, R' is alkoxy, aryloxy or aralkoxy and R'' is alkyl, aryl or aralkyl. Acylation of the monomethyl compounds is accomplished in conventional manner using an appropriate acyl halide or acid anhydride such as acetic anhydride, benzoyl chloride, phenylacetyl chloride and the like.

Those starting compounds utilized in Step 1 of the above process, wherein R is alkoxy, aryloxy or aralkoxy, may be prepared by treating the known 10,11-dihydro-5-(3 - dimethylaminopropyl) - 5H - dibenzo[a,d]cycloheptene, 10,11 - dihydro - 5 - (3 - dimethylaminopropylidene)-5H-dibenzo[a,d]cycloheptene, or nuclearly substituted derivative thereof, with a haloformate as described in copending application Ser. No. 194,659, filed May 14, 1962.

The preparation of those starting compounds having a propyl side chain (A) can also be accomplished by hydrogenation of the corresponding compounds having a propylidene side chain (B). The hydrogenation is readily effected by contacting the propylidene compound, preferably dissolved in a suitable inert organic solvent such as a lower alkanol, with hydrogen, under pressure, and in the presence of a conventional hydrogenation catalyst such as palladium on charcoal, platinum oxide, Raney nickel and the like. In the event that the propylidene compound is sensitive to hydrogenation, such as when R is aralkoxy, it is desirable in order to obtain optimum yields of the desired propyl compound to hydrogenate the known 10,11-dihydro-5 - (3-dimethylaminopropylidene)-5H-dibenzo-[a,d]cycloheptene or nuclearly substituted derivative thereof following the above procedure and then react the resulting 10.11-dihydro-5-(3-dimethylaminopropyl)-5H-dibenzo[a,d]cycloheptene with the aralkoxy haloformate, as described in the above-mentioned copending application. This procedure can also be used for the preparation of those propyl compounds wherein R is alkoxy and aryloxy, using the appropriate haloformate.

The compounds represented by structural Formulas I and II and the nuclearly substituted derivatives thereof, mentioned hereinabove, are useful in the treatment of mental health conditions as they are antidepressants and serve as mood elevators or psychic energizers. In such usage, the compounds may be administered (as the base or acid addition salt) orally or parenterally in the form of aqueous solutions or suspensions or administered orally in the form of tablets, powders, capsules or sustained release pellets by combining the compound with a pharmaceutical carrier and other pharmaceutical excipients in conventional manner. The daily dosage is within the range of 5 mg. to about 250 mg., preferably taken in divided amounts over the day.

The examples which follow will further illustrate the invention.

Example 1.—5-[3-(N-methyl-N-carbethoxyamino)-propylidene]-5H-dibenzo[a,d]-10,11-dihydrocycloheptene A solution of 27.7 g. of 5-[3-(N-dimethylamino)-propylidene] - 5H-dibenzo[a,d] - 10,11-dihydrocycloheptene (0.1 mol.) in 100 ml. of benzene is added during one hour into a solution of 32.4 g. of ethyl chloroformate (0.3 mol.) in 100 ml. of benzene under stirring. The reaction solution is refluxed for 2 hours, then extracted with 3×100 ml. of 2.5 N HCl, washed with water (2×50 ml.), dried over MGSO₄ and evaporated to dryness. 29.5 g. of a thick oil is obtained which is substantially pure urethane; yield, 88% of theory.

Example 2.—5-[3-(N-methyl-N-carbethoxyamino)-propyl]-5H-dibenezo[a,d]-10,11-dihydrocycloheptene 6.7 g. of 5-[3-(N-methyl-N-carbethoxyamino)-propylidene] - 5H - dibenzo[a,d] - 10,11-dihydrocycloheptene (0.02 g. mol.) is dissolved in 40 ml. of methanol; 2 g. of Pd-charcoal (10% Pd) is added and the mixture is hydrogenated at 300 lb./p.s.i. at 85° C. for about 14 hours. An uptake of about 0.02 mol. of hydrogen is observed. The catalyst is filtered and the methanol is evaporated to give 6.5 g. of an oily residue which is the product in substantially pure form.

*Analysis.*—C, Calcd. 78.4%, found 78.3%; H, Calcd. 8.0%, found 8.13%; N, Calcd. 4.16%, found 3.99% (absorption peak at 235 mµ is absent).

Following the procedure described above and using the N-carbophenoxy urethane compound in place of the N-carboethoxyamino compound, there is produced the corresponding N-carbophenoxy compound.

Example 3.—5-[3-(N-methyl-N-carbenzoxyamino)-propyl]-5H-dibenzo[a,d]-10,11-dihydrocycloheptene Into a solution of 62.7 g. of 5-(3-dimethylaminopropylidene) - 5H - dibenzo[a,d] - 10,11-dihydrocycloheptene (0.2) mol.) in 400 ml. of methanol there is added 4 ml. of concentrated hydrochloric acid; after the addition of 10 g. of palladium on charcoal catalyst, it is hydrogenated at 1,000 lbs. starting pressure at 85° C. for 20 hours. It is then filtered through Supercel and the completeness of the reduction checked by the U.V. absorption peak at 239 mµ; the peak disappears completely and only a trace of absorption is observed at 263 mµ and 270 mµ. The filtrate then is concentrated in vacuo to a thick oil. The oil is then dissolved in 200 ml. of water, and a solution of 32 g. of sodium hydroxide in 140 ml. of water is added. The base is extracted with benzene (3×100 ml.), dried over MgSO₄, and concentrated in vacuo to constant weight. 55.9 g. of the 10,11-dihydro derivative of the starting material is obtained as a nearly colorless oil.

A solution of 52 4.g. of the above produced dihydro compound (0.188 mol.) in 216 ml. of benzene is added during one hour with stirring into a solution of 105 g. of benzyl chloroformate in 580 ml. of benzene and the solution is refluxed for 2 hours. After the reaction is complete, the mixture is extracted with 2.5 N HCl (3×100 ml.) and water, dried over MgSO₄, and the solvent evaporated to dryness to give 56.4 g. of 5-[3-(N-methyl-N-carbenzoxyamino)-propyl] - 5H-dibenzo[a,d] - 10,11-dihydrocycloheptene.

Example 4.—5-[3-(N-methyl-N-acetylamino)-propyl]-5H-dibenzo[a,d]-10,11-dihydrocycloheptene 27.7 g. of 5-[3-N-dimethylamino)-propyl]-5H-dibenzo[a,d]-10,11-dihydrocycloheptene (0.1 mol.) dissolved in 100 ml. of benzene is added during one hour to a solution of 32.4 g. ethyl chloroformate (0.3 mol.) in 100 ml. of benzene at room temperature. The solution is refluxed with stirring for 20 hours, cooled to room temperature, and extracted with 3 × 100 ml. of 2.5 N HCl, washed with water (2 × 50 ml.), dried over magnesium sulfate and evaporated to dryness. A thick oil is obtained representing pure 5 - [3 - (N - methyl-N-carbethoxyamino)-propyl] - 5H - dibenzo[a,d]-10,11-dihydrocycloheptene. The yield is 29.5 g. or 88% of the theoretical yield.

29.5 g. of 5-[3-(N-methyl-N-carbethoxyamino)-propyl] 5H-dibenzo [a,d]-10,11-dihydrocycloheptene is refluxed for 9 hours under nitrogen in a solution of 24.2 g. of potassium hydroxide in 255 ml. of n-butanol. After cooling to room temperature, the solvent is evaporated in vacuo, the residue is stirred with 200 ml. of water, 300 ml. of n-hexane, the layers separated, the water layer extracted again with 100 ml. of n-hexane, the combined layers washed with water (2 × 100 ml.) and then with 0.5 N sulfuric acid (100 × 80 × 100 ml.). The acid solution is then alkalized and extracted with ether (2 × 150 ml. and 1 × 100 ml.), dried over MgSO₄ and the solution evaporated to dryness. 19.7 g. of a slightly yellow, clear thick oil is produced representing substantially pure 5-[3 - (N - methyl)-aminopropyl]-5H-dibenzo[a,d]-10,11-dihydrocycloheptene; M.P. 54–55° C. (85% of theoretical yield).

To a solution of 25 g. of 5-[3-(N-methyl)-aminopropyl]-5H-dibenzo[a,d]-10,11-dihydrocycloheptene in 50 ml. of pyridine, 7 g. of benzoyl chloride is added and the mixture is refluxed for one hour. Excess pyridine and anhydride are distilled off in vacuo (2–5 mm.). The residue is dissolved in 100 ml. of benzene, washed with diluted HCl and NaHCO₃ solution, dried over MgSO₄ and the benzene evaporated to give substantially pure 5-[3-(N-methyl-N-acetyl)-aminopropyl] - 5H - dibenzo[a,d]-10,11-dihydrocycloheptene.

Example 5.—5-[3-N-methyl-N-benzoylamino)-propyl]-5H-dibenzo[a,d]-10,11-dihydrocycloheptene To a solution of 13.2 g. of 5-[3-(N-methyl)-aminopropyl] - 5H - dibenzo[a,d]-10,11-dihydrocycloheptene in 30 ml. of pyridine, 1.5 g. of acetic anhydride is added and the mixture kept at room temperature overnight. The mixture is poured onto 200 g. of ice-water, extracted with 3 × 100 ml. of ether, the extract washed with dilute HCl, then with diluted carbonate solution, dried over MgSO₄ and the ether evaporated. The residue is recrystallized from ethanol to give pure 5-[3-(N-methyl - N - benzoylamino)-propyl]-5H-dibenzo[a,d] - 10,11 - dihydrocycloheptene.

Example 6.—A mixture of 5-[3-(N-methyl-N-carbethoxyamino) - propyl]-5H-dibenzo[a,d]-10-bromo-10,11-dihydrocycloheptene and 5 - [3-(N-methyl-N-carbethoxyamino)-propyl]-5H-dibenzo[a,d]cycloheptene 67.4 g. (0.2 mol.) of 5-[3-(N-methyl-N-carbethoxyamino) -propyl]-5H-dibenzo[a,d]-10,11-dihydrocycloheptene is dissolved in 500 ml. of carbon tetrachloride and mixed with 43 g. (0.24 mol.) of N-bromosuccinimide; 0.6 g. of azo-bis-butyronitrile and 24.2 g. (0.2 mol.) of symmetric collidine is added and the mixture is refluxed with stirring for 15 minutes. When the mixture reaches the boiling point, a vigorous reaction begins. After standing at ice-box temperatures for a few hours, the separated mixture of succinimide and collidine hydrobromide is filtered. The filtrate is then concentrated in vacuo, the residue dissolved in 300 ml. of benzene, washed free of collidine (5 × 100 ml. of 10% H₂SO₄), then with water until acid free, dried over MgSO₄ and evaporated to dryness to give 74 g. of a thick oil, consisting of a mixture of 5-[3-N-methyl - N - carbethoxyamino)-propyl]-5H-dibenzo[a,d]-10-bromo-10,11-dihydrocycloheptene and 5-[3-(N-methyl-N - carbethoxyamino)-propyl]-5H-dibenzo[a,d]cycloheptene.

Following the procedure described above and using the N-carbomethoxy, N-carbophenoxy, N-carbobenzoxy, N-acetyl, N-benzoyl and N-phenyl-acetyl urethane compounds in place of the N-carboethoxyamino compound, there are produced the corresponding N-carbomethoxy, N-carbophenoxy, N-carbobenzoxy, N-acetyl, N-benzoyl and N-phenyl-acetyl compounds.

Example 7.—5-[3-(N-methyl-N-carbethoxyamino)-propyl]-5H-dibenzo[a,d]cycloheptene 36.1 g. of the mixture obtained in Example 6 is refluxed in a mixture of 77 ml. of dimethylformamide and 77 ml. of triethylamine (with stirring, under nitrogen) for 2 hours. The reaction mixture then is quenched by pouring onto a mixture of 300 g. of ice and 400 g. of 25% sulfuric acid, extracted with benzene (1×500 ml.; 3×200 ml.), backwashed with 3×100 ml. of diluted HCl, then the benzene washed until neutral with water, dried over MgSO₄ and evaporated to dryness to give 31.5 g. of crystals representing the product. U.V. absorption (in methanol): λ max. at 291 mμ; E% 350, indicating 88.5% of purity. Recrystallization from methanol affords pure urethane in the form of colorless crystals, M.P. 71–72° C.

Following the procedure described above and using the N-carbomethoxy, N-carbophenoxy, N-acetyl, N-benzoyl, N-carbobenzoxy and N-phenylacetyl urethane compounds in place of the N-carboethoxyamino compound, there are produced the corresponding N-carbomethoxy, N-carbophenoxy, N-acetyl, N-benzoyl, N-phenylacetyl and N-carbobenzoxy compounds.

Example 8.—5-(3-methylaminopropyl)-5H-dibenzo-[a,d]cycloheptene 14.5 g. of 5-[3-(N-methyl-N-carbethoxyamino)-propyl]-5H-dibenzo[a,d]cycloheptene is added to a solution of 17.3 g. of KOH in 155 ml. of N-butanol and the mixture refluxed with stirring under N₂ atmosphere for 17 hours. The solvent is distilled off in vacuo, 170 ml. of H₂O and 170 ml. of 2 N sulfuric acid is added to the residue, heated up shortly to 70° C., extracted with hexane (2×200 ml.); the acid layer is alkalized by adding thereto 12 N sodium hydroxide solution (phenolphthalein indicator); the separated base extracted with ether, washed with water, dried and evaporated to yield 9 g. of an oily product which is identified as 5-(3-methylaminopropyl)-5H-dibenzo[a,d]cycloheptene. Recrystallization from oxalic acid in ethanol gives the crystalline hemioxalate, M.P. 180–181° C.

Following the procedure described above and using the N-carbomethoxy, N-carbophenoxy, N-carbobenzoxy, N-acetyl, N-benzoyl and N-phenylacetyl urethane compounds in place of the N-carboethoxyamino compound, there is produced the same methylaminopropyl compound as above.

We claim:
1. A compound of the following structural formula:

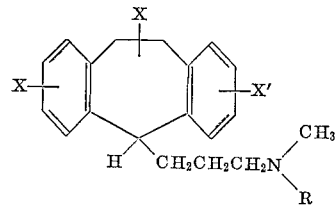

wherein Y is halo, R is lower-alkoxycarbonyl, phenoxycarbonyl, benzyloxycarbonyl, lower-alkanoyl, benzoyl or phenacetyl, and X and X' are selected from the group consisting of lower alkyl, perfluoroloweralkyl amino, loweralkylamino, diloweralkylamino, loweralkylsulfonylamino, halogen, hydroxy, loweralkoxy, perfluoroloweralkoxy, cyano, carboxy, mercapto, loweralkylmercapto, perfluoroloweralkylmercapto, loweralkylsulfonyl, perfluoroloweralkylsulfonyl, sulfamoyl, loweralkylsulfamoyl and diloweralkylsulfamoyl.

2. 10 - bromo - 10,11 - dihydro - 5 - [3 - (N - methyl-N - carbethoxyamino) - propyl] - 5H - dibenzo[a,d]cycloheptene.

References Cited

UNITED STATES PATENTS

| | | | |
|---|---|---|---|
| 3,264,342 | 8/1966 | Schindler | 260—471 |
| 2,730,556 | 1/1956 | Liedholm | 260—696 |
| 3,052,721 | 9/1962 | Bernstein et al. | 260—562 |

OTHER REFERENCES

Morrison et al., Organic Chemistry, 1961, Allyn and Bacon, Inc., Boston, p. 810 relied on.

Villani et al., J. Med. and Phar. Chem. 5(2), March 1962, pp. 373–383 relied on.

Morrison et al., Org. Chem., February 1961, Allyn and Bacon, Inc., Boston, pp. 481 and 555 relied on.

Snyder et al., J.A.C.S., vol. 70 (January–June) 1948, pp. 237–39 relied on.

LORRAINE A. WEINBERGER, *Primary Examiner.*

L. A. THAXTON, *Assistant Examiner.*